United States Patent [19]

Scag

[11] Patent Number: 4,487,006
[45] Date of Patent: Dec. 11, 1984

[54] LAWN MOWER

[76] Inventor: Dane T. Scag, P.O. Box 589, Elm Grove, Wis. 53122

[21] Appl. No.: 485,319

[22] Filed: Apr. 15, 1983

[51] Int. Cl.³ .......................................... A01D 35/262
[52] U.S. Cl. .................................... 56/14.7; 56/10.7; 56/16.7; 280/400
[58] Field of Search .................. 56/6, 10.1, 10.7, 17.1, 56/503, 208, 14.7, 16.7, 214, 15.9; 280/400

[56] References Cited

U.S. PATENT DOCUMENTS

| | | | |
|---|---|---|---|
| 2,218,064 | 10/1940 | Amsbury | 280/87.1 |
| 2,660,447 | 11/1953 | Bear | 280/87.1 |
| 2,792,898 | 5/1957 | Mast | 180/11 |
| 3,009,305 | 11/1961 | Cizek | 56/17.1 |
| 3,196,971 | 7/1965 | Schantz | 56/17.1 |
| 3,336,042 | 8/1967 | Southall | 280/47.37 |
| 3,927,510 | 12/1975 | Arnblock | 56/12.8 |

FOREIGN PATENT DOCUMENTS

| | | | |
|---|---|---|---|
| 516674 | 2/1955 | Italy | 56/16.7 |
| 86292 | 8/1955 | Norway | 56/16.7 |
| 807207 | 1/1959 | United Kingdom | 56/16.7 |
| 1395661 | 5/1975 | United Kingdom | 56/16.7 |

Primary Examiner—Gene Mancene
Assistant Examiner—John G. Weiss
Attorney, Agent, or Firm—Fred Wiviott

[57] ABSTRACT

A lawn mower comprises a steering frame pivotally connected to an engine unit which is attached to a mower unit comprising a cutter deck and a cutter assembly. The center of gravity of the engine, transmission, battery and fuel tank is disposed to the rear of the drive wheel axis to counterbalance the weight of the mower unit. The steering frame is pivotally attached to the engine platform at a distance from the drive wheel axis which is a small fraction of the distance between this axis and the cutter deck front castor wheels. The engine and cutter units may be tilted about the drive wheel axis by a cable which extends from the steering frame at an angle of approximately 90 degrees to a radial line extending from the drive wheel axis.

7 Claims, 2 Drawing Figures

LAWN MOWER

BACKGROUND OF THE INVENTION

This invention relates to lawn mowers and more particularly to mowers of the type which include a riding frame pivotally connected to a mower assembly.

One type of lawn mower employed for cutting larger areas comprises a motor and drive assembly which is integral with the cutting assembly. A riding sulky is pivotally connected to the mower assembly for supporting the operator and includes a steering assembly and various controls. This type of mower, while less expensive than a full tractor, has certain shortcomings. For example, the pivotal connection between the riding sulky and the mower assembly often creates instability when operating in reverse, tight turns or on undulating terrain. Such mowers also tend to be unstable when the mower assembly is raised to permit servicing. In addition, the weight distribution of some prior art mowers of this type result in a tendency to bounce when traversing an uneven surface whereby scalping resulted.

SUMMARY OF THE INVENTION

It is the object of the invention to provide a new and improved lawn mower.

A further object of the invention is to provide a lawn mower which is stable in reverse, tight turns and undulating terrain.

Another object of the invention is to provide a riding lawn mower which is stable when the mower unit is elevated for servicing or when the operator dismounts.

Yet another object of the invention is to provide a lawn mower wherein the tendency to scalp is minimized.

These and other objects and advantages of the present invention will become more apparent from the detailed description thereof taken with the accompanying drawings.

In general terms, the invention comprises a lawn mower having a riding unit and a power and cutting unit. A pair of drive wheels are mounted for rotation on the power and cutting unit and about a first axis extending adjacent to the rear end thereof and a second pair of wheels are mounted adjacent to the front of the power and cutting unit. The riding unit includes a frame having a pair of forwardly extending arms which are pivotally coupled to the power and cutting unit about a second axis parallel to and disposed rearwardly relative to the first axis with the second axis being located closer to the first axis than the second pair of wheels. The power and cutting unit also includes a cutting assembly and a drive assembly having an engine coupled to the drive wheels and to the cutting assembly with the center of gravity of the cutting assembly being disposed on one side of the first axis and the center of gravity of the drive assembly being disposed on the other side thereof.

According to another of its aspects the invention comprises a lawn mower having a riding unit and a power and cutting unit. A pair of drive wheels are mounted for rotation on the power and cutting unit and about a first axis extending adjacent the rear thereof and a second pair of wheels are mounted adjacent the front of the power and cutting unit. The riding unit also includes a frame pivotally coupled to said power and cutting unit and the power and cutting unit includes a cutting assembly and a drive assembly having an engine coupled to said drive wheels and to said cutting assembly bly the center of gravity of said cutting assembly being displaced on one side of said first axis, said cutting assembly being disposed forwardly of said drive assembly and with its center of gravity located on the opposite of said axis.

DETAILED DESCRIPTION OF THE PREFERRED EMBODIMENT

Figure 1:
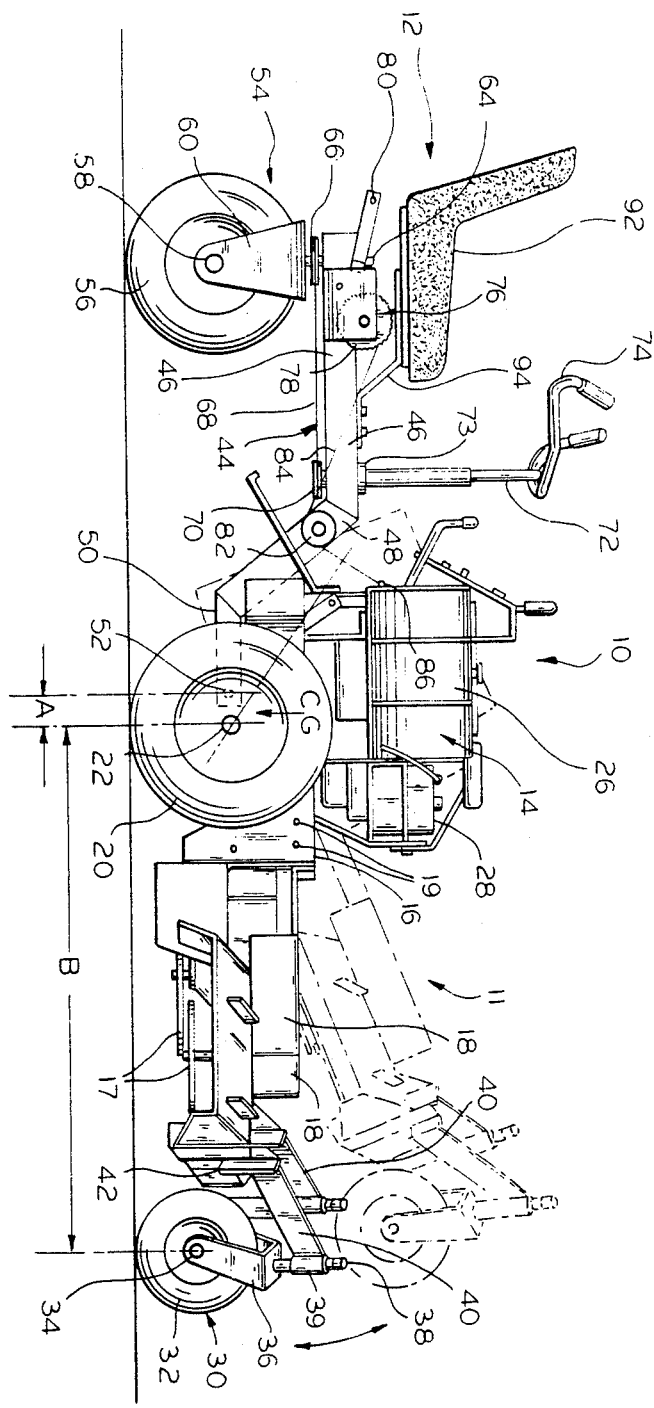
FIG. 1 is a side elevational view of the lawn mower in accordance with a preferred embodiment of the invention.
Figure 2:
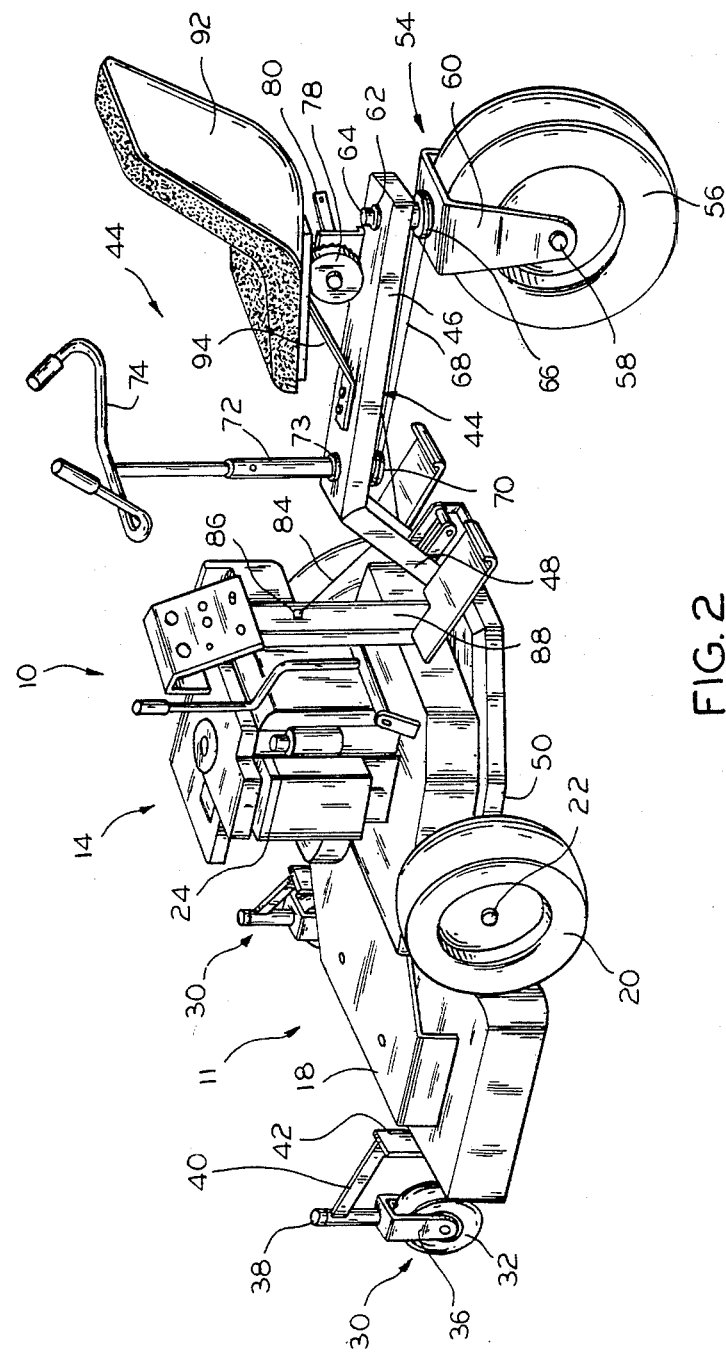
FIG. 2 is a perspective view of the lawn mower in accordance with the invention.

The lawn mower 10 according to the preferred embodiment of the invention is shown in the drawings to include a drive and cutter unit 11 and a riding unit 12. The drive and cutter unit includes an engine assembly 14 mounted on an engine deck 16 and a cutter assembly 17 which is housed below a mower deck 18. The engine deck 16 and the mower deck 18 are rigidly secured in any suitable manner such as by bolts 19.

A pair of drive wheels 20 are fixed to a shaft 22 which is journalled for rotation in bearings (not shown) which are mounted on the engine deck 16. As those skilled in the art will appreciate, the engine assembly is suitably coupled to the shaft 22 by means of a transmission or the like, whereby the wheels 20 may be driven in a forward or reverse direction. Similarly, the engine assembly 14 is suitably connected for rotating the cutter assembly 17.

The engine assembly 14 includes a conventional gasoline engine 24, a transmission (not shown), a fuel tank 26 and a battery 28, all of which are mounted on the engine deck 16. In particular, the engine assembly 14 and the deck 16 are arranged such that their combined center of gravity CG is on the opposite side of the axis of the shaft 22 relative to the cutter assembly 17 and the cutter deck 18.

The front end of the drive and cutter 11 is supported on a pair of spaced-apart castors 30 each of which includes a castor wheel 32 rotatably mounted on a shaft 34 extending between the arms of a yoke 36. A second shaft 38 extends upwardly from the yoke 36 and is rotatably received in a vertical bearing 38 carried at the end of an arm 40 extending upwardly and forwardly from a vertical bracket 42 mounted at the front of deck 18.

The riding unit 12 includes a frame 44 fabricated of channel or box sections and having a horizontal first portion 46, a mid-portion 48 which slopes downwardly and forwardly from the first portion to a pair of fork arms 50 which project outwardly and forwardly around the engine deck 16. The forward ends of the fork arms 50 are pivotally connected to the engine deck 16 by pivot pins 52 which are located just to the rear of the drive shaft 22. In particular, the axis of the pins 52 are located a distance A from the axis of the shaft 22 while the axes of the castors 34 are located a distance B from the axis of the shaft 22. Preferably, the ratio of the distance B to the distance A is quite large, and may, for example, be in the order of ten or more.

A steering wheel assembly 54 is mounted below the rear end of the first frame portion 46 and includes a relatively large wheel 56 rotatably mounted on a shaft 58 extending between the arms of a downwardly extending yoke 60. A bearing 62 is mounted on the frame portion 46 for receiving a shaft 64 extending upwardly from an affixed to the yoke 60.

Steering is accomplished by means of a sheave 66 above the yoke 60 and which is coupled by a cable 68 to a sheave 70 mounted at the lower end of a steering post 72 rotatably mounted in a bearing 73 located at the forward end of frame portion 46. A pair of handle bars 74 are mounted at the upper end of post 72. It will be appreciated that when the handle bars 74 are pivoted to rotate the post 72, one leg of the cable 68 will shorten thereby causing the wheel 56 to pivot within the bearing 62.

In order to elevate the forward end of the mover assembly for servicing and maintenance, a winch assembly 76 is provided. This includes a winch 78 rotatably mounted about a horizontal axis intermediate the ends of frame portion 46 and having a handle 80 to permit manual operation. In addition, a sheave 82 is mounted on the frame section 48 just above its junction with the fork members 50. A cable 84 extends from the winch 78 downwardly around the sheave 82 and then upwardly to a lug 86 which is affixed to the instrument panel frame 88 which extends rigidly upwardly from the back of the engine deck 16. The winch 78, the sheave 82 and the lug 86 are so located that the cable portion between the sheave 82 and the lug 86 is oriented at an angle of approximately 90 degrees from a radial line extending from the axis of shaft 22.

A seat 92 is also mounted on the frame 46 by means of a spring member 94. In addition, a pair of foot rests 96 are mounted adjacent the rear of the engine deck 16.

Because the relatively heavy components such as the engine deck 16, the engine 24, the transmission, the fuel tank 26 and the battery 28 are all positioned such that their combined center of gravity CG is rearward of the drive wheel axis, they act to counterbalance the weight of the cutter assembly 17 and the deck 18 without the use of auxiliary devices such as springs. In addition, the moment arm and weight of the rider steering frame is preferably sufficient to prevent instability when the drive and cutter unit is raised and when the operator dismounts the seat 82. Preferably, the ground pressure applied by the castor wheels 32 is relatively small, i.e., between 25-100 pounds, to minimize scalping and unnecessary bouncing. Further, the arrangement and weight distribution and low center of gravity of the various components and the tread distance between the main drive wheel permits safe operation on slopes of as much as 25-30 degrees without the danger of tipping over at any angle of travel. The illustrated steering assembly permits a relatively small steering radius so that the inside drive wheel will either be stopped or actually rotate in a reverse direction from the outside drive wheel without the use of independent wheel drives.

By connecting the frame 44 to the drive and cutter assembly 11 at point close to the axis of the drive shaft 22, the assembly is realtively stable in reverse and tight turns. In addition, operator vertical displacement is substantially reduced because the point of attachment of the riding unit 12 is substantially closer to the axis 52 points of the assembly than the front castor wheels 30.

While only a single embodiment of the invention has been illustrated and described, it is not intended to be limited thereby, but only by the scope of the independent claims.

I claim:

1. A lawn mower comprising a riding unit and a power and cutting unit having a front and rear, a pair of drive wheels mounted for rotation on the power and cutting unit about a first axis extending adjacent to the rear thereof,
   additional wheel means mounted adjacent the front of said power and cutting unit,
   said riding unit including a frame having a pair of forwardly extending arms, said arms being pivotally coupled to said power and cutting unit about a second axis parallel to the first axis,
   the second axis being located closer to said first axis than said additional wheel means,
   said power and cutting unit including a cutting assembly and a drive assembly having an engine coupled to said drive wheels and to said cutting assembly,
   said power and cutting unit having a support means extending upwardly therefrom and rearwardly relative to said engine,
   winch means and an idler sheave mounted on said riding unit frame,
   a cable extending from said winch means and around said idler sheave and extending to a point of attachment on said support means and along a line oriented at an angle of about 90 degrees relative to a radial line extending from said first axis so that the force required to rotate said winch and thereby tilt the power and cutting unit upwardly about the drive wheels will remain substantially constant as the power and cutting unit is tilted.

2. The lawn mower set forth in claim 1 and including a single steering wheel mounted below said riding frame and displaced rearwardly from said drive wheels, shaft means extending upwardly from said steering wheel and received in a vertically oriented bearing means in said frame, and steering means mounted on said frame for pivoting said steering wheel about the axis of said bearing means.

3. The lawn mower set forth in claim 1 wherein the second axis is displaced rearwardly of and in the same horizontal plane as the first axis, the distance between said axes being no greater than one tenth the distance between the first axis and the additional wheel means.

4. A lawn mower comprising a riding unit and a power and cutting unit having a front and rear,
   a pair of drive wheels mounted for rotation on the power and cutting unit about a first axis extending adjacent the rear thereof,
   said riding unit including a frame pivotally coupled to said power and cutting unit and an operator seat mounted on the frame, additional wheel means mounted below said frame,
   said power and cutting unit including a cutting assembly and a drive assembly having an engine coupled to said drive wheels and to said cutting assembly,
   said power and cutting unit having a support means extending upwardly therefrom and having a portion disposed rearwardly of said engine,
   winch means disposed on said frame adjacent said operator seat, and an idler sheave mounted on said riding unit frame between said operator seat and the power and cutting unit,
   a cable extending from said winch means and around said idler sheave and being attached to the support means on said cutting and power unit, said cable extending along the line oriented at an angle of about 90 degrees relative to a radial line extending from said axis.

5. The lawn mower set forth in claim 4 wherein said additional wheel means comprises a single steering wheel mounted below said riding frame and displaced rearwardly from said drive wheels, shaft means extending upwardly from said steering wheel and received in a vertically oriented bearing means in said frame, and steering means mounted on said frame for pivoting said steering wheel about the axis of said bearing means.

6. A lawn mower comprising a riding unit and a power and cutting unit having a front and a rear, a pair of drive wheels mounted for rotation on the power and cutting unit about a first axis extending adjacent to the rear thereof,
   additional wheel means mounted adjacent the front of said power and cutting unit,
   said riding unit including a frame pivotally coupled to said power and cutting unit about a second axis parallel to the first axis,
   said power and cutting unit including a cutting assembly and a drive assembly having an engine coupled to said drive wheels and to said cutting assembly,
   support means extending upwardly from said power and cutting unit and rearwardly relative to said engine,
   winch means mounted on said riding unit frame,
   a cable extending from said winch means to a point of attachment on said support means and along a line oriented at an angle of about 90 degrees relative to a radial line extending from said first axis so that the force required to rotate said winch means and thereby tilt the power and cutting unit upwardly about the drive wheels will remain substantially constant as the power and cutting unit is tilted.

7. The lawn mower set forth in claim 6 wherein said winch means includes an idler sheave mounted on said riding unit frame, said cable extending around said idler sheave and to a point of attachment on said support means and along a line oriented at an angle of about 90 degrees relative to a radial line extending from said first axis so that the force required to rotate said winch means and thereby tilt the power and cutting unit upwardly about the drive wheels will remain substantially constant as the power and cutting unit is tilted.

* * * * *